United States Patent
Iseki et al.

(10) Patent No.: US 7,843,580 B2
(45) Date of Patent: Nov. 30, 2010

(54) IMAGE PROCESSING SYSTEM, METHOD OF CONTROLLING THE IMAGE PROCESSING SYSTEM AND CONTROL PROGRAM FOR THE IMAGE PROCESSING SYSTEM

(75) Inventors: Yukimasa Iseki, Chiba-ken (JP); Yoshinori Isobe, Ibaraki-ken (JP); Koji Doi, Kanagawa-ken (JP); Kenji Hiromatsu, Chiba-ken (JP); Masashi Oyumi, Chiba-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1167 days.

(21) Appl. No.: 11/078,286

(22) Filed: Mar. 14, 2005

(65) Prior Publication Data

US 2005/0206949 A1    Sep. 22, 2005

(30) Foreign Application Priority Data

Mar. 18, 2004 (JP) ............................. 2004-077380

(51) Int. Cl.
G06F 3/12 (2006.01)
G06Q 30/00 (2006.01)

(52) U.S. Cl. .................. 358/1.15; 358/1.13; 705/14.13; 705/14.25; 705/14.27

(58) Field of Classification Search ................ 358/1.13, 358/1.15
See application file for complete search history.

(56) References Cited

U.S. PATENT DOCUMENTS

| | | | |
|---|---|---|---|
| 5,812,747 A * | 9/1998 | Kayano et al. ............. | 358/1.15 |
| 6,837,436 B2 * | 1/2005 | Swartz et al. ........... | 235/472.02 |
| 7,046,383 B1 * | 5/2006 | Ueda et al. ................. | 358/1.15 |
| 2001/0032185 A1 | 10/2001 | Masaki | |
| 2002/0174076 A1 * | 11/2002 | Bertani ........................ | 705/400 |
| 2002/0181022 A1 * | 12/2002 | Tokashiki ................... | 358/1.18 |
| 2002/0196452 A1 * | 12/2002 | Komiya ...................... | 358/1.1 |
| 2003/0088471 A1 * | 5/2003 | Tanigaki et al. ............... | 705/20 |
| 2003/0095618 A1 | 5/2003 | Iseki .......................... | 375/354 |
| 2003/0216967 A1 * | 11/2003 | Williams ...................... | 705/14 |
| 2004/0009023 A1 * | 1/2004 | Nihei .......................... | 400/76 |

FOREIGN PATENT DOCUMENTS

| | | |
|---|---|---|
| JP | 6-208682 | 7/1994 |
| JP | 7-64744 | 3/1995 |
| JP | 11-184655 | 7/1999 |
| JP | 11-203082 | 7/1999 |
| JP | 2001-357126 | 12/2001 |
| JP | 2002-2068 | 1/2002 |

\* cited by examiner

Primary Examiner—Mark K Zimmerman
Assistant Examiner—Fan Zhang
(74) Attorney, Agent, or Firm—Fitzpatrick, Cella, Harper & Scinto

(57) ABSTRACT

An image processing system for enabling a manufacturer's image forming apparatuses to be used as far as possible by a user. Design is made to enable a manufacturer or a vendor to appeal the predominance, particularly economy, of their own image forming apparatuses by the utilization of a user interface for controlling a recording process.

1 Claim, 10 Drawing Sheets

| TYPE OF SHEET | PRINT COUNT (YEN) | |
|---|---|---|
| | APPARATUS A (BLACK AND WHITE) | APPARATUS B (COLOR) |
| A4 | 5 | 20 |
| A3 | 10 | 30 |
| ⋮ | ⋮ | ⋮ |

|  | COUNT-UP AMOUNT OF A4 COPY COUNTER ||
|  | NORMAL | WHEN SELECTING PRINTERS A+B |
| --- | --- | --- |
| PRINTER A | 2 | 1 |
| PRINTER B | 2 | 1 OR 2 |
| PRINTER C | 2 | — |

FIG. 8

|  | TRANSFER DATA ON SINGLE-SIDE COPYING OF A4 | | |
|---|---|---|---|
|  | NORMAL | WHEN SELECTING PRINTERS A+B | PROCESSING BY ACCOUNTING SERVER |
| TOTAL | ○ | ○ |  |
| SINGLE-SIDE OF A4 | ○ |  | NUMBER OF COUNTS × ¥20 |
| TWO-SIDES OF A4 |  |  |  |
| ⋮ |  |  |  |
| SINGLE-SIDE OF A4 WHEN INTERLOCKING PRINTERS |  | ○ | NUMBER OF COUNTS × ¥10 |
| SINGLE-SIDE OF A4 WHEN INTERLOCKING PRINTERS |  |  |  |
| ⋮ |  |  |  |

FIG. 12

|  | COUNT-UP AMOUNT OF A4 COPY COUNTER ||
|---|---|---|
|  | NORMAL | WHEN SELECTING PRINTERS A+B |
| PRINTER A | 2 | 1 |
| PRINTER B | 2 | 2 |
| PRINTER C | 2 | – |

IMAGE PROCESSING SYSTEM, METHOD OF CONTROLLING THE IMAGE PROCESSING SYSTEM AND CONTROL PROGRAM FOR THE IMAGE PROCESSING SYSTEM

BACKGROUND OF THE INVENTION

1. Field of the Invention

The invention relates to an image processing system including a plurality of network-connected image forming apparatuses and record-processing record data by the use of at least two of the plurality of image forming apparatuses, a control method therefor and a control program therefor.

2. Description of the Related Art

In image forming apparatuses such as copying machines and printers, there has heretofore been a contract form in which accounting is done for each print. In an accounting system for conventional image forming apparatuses, as shown in FIG. 1 of the accompanying drawings, it is often the case that for each kind of machine, a unit cost per print is predetermined.

As a matter of course, a difference comes out in this unit cost of print depending on the types of apparatuses, the sizes of printing paper and the manner of printing (such as two sides). The example shown in FIG. 1 is an example in which the unit cost is divided broadly by whether the apparatus is a black-and-white one or a color one, and thereafter is subdivided by the type of sheet. The reason why the unit cost thus becomes different depending on the types of apparatuses, the sizes of printing paper and the manner of printing is that the rates of consumption of expendables such as toners and photosensitive drums become different. Usually, the counter of an image forming apparatus is counted up for each print, where after a serviceman reads the count value thereof or an accounting server on the network totalizes the count values of the counters of image forming apparatuses on the network through a network protocol, whereby a charge per print is claimed to a user.

On the other hand, in response to the flow of systematization in recent years, almost all image forming apparatuses are digitized and have become connectable to the network. Many of these image forming apparatuses are connected to the LAN of each user and have been designed to be integrally controlled/managed by PC or the server or the like.

In this manner, the image forming apparatuses are connected to the network and managed integrally, whereby an image processing system which has not heretofore been seen has come out. That is, such processing as effecting one kind of processing by distributing it to two or more image forming apparatuses, or effecting the exchanges of data among image forming apparatuses produced by different manufacturers has become possible and as a result, convenience on the part of the user can be greatly improved. Particularly, if an image recording process can be automatically distributed to a plurality of image forming apparatuses and carried out thereby, a print job can be distributed among optimum image processing apparatuses without troubling the user in the case of a great deal of print of black-and-white/color mixed print or the like, and distributed recording can be effected.

Japanese Patent Application Laid-open No. H07-64744 or Japanese Patent Application Laid-open No. H11-203082 discloses a technique of distributing a print job among a plurality of network printers on the basis of resource information describing the capability of printers on the network.

As items which become standards in the print job distributing process in distributed recording, mention may be made of:

the current state of each image forming apparatus;
the reliability of each image forming apparatus;
the performance of each image forming apparatus;
the print unit cost of each image forming apparatus, etc.

For example, under an environment as shown in FIG. 2 of the accompanying drawings wherein on LAN 1, a terminal 10 (such as PC) as an image recording client, a printer server 14 and a plurality of printers (11: printer A, 12: printer B, and 13: printer C) are network connected, such control as shown in FIG. 3 of the accompanying drawings can be effected to thereby effect distributed recording.

The control of FIG. 3 shows the flow of the entire distributed recording, and the control of FIG. 3 can be effected, for example, by the terminal 10 or the liaison processing of the terminal 10 and a printer server 14. When at a step S301, a printing command is inputted at the terminal 10 and a request for print is generated, the processing of a step S302 and subsequent steps is executed.

At the step S302, the current states of the printers 11 to 13 are grasped by the use of a suitable network print protocol. The states of the printers 11 to 13 to be grasped here include whether they are in print job processing, whether the printers are in on-line state and are available (whether they are jammed), etc.

At a step S303, whether data to be printed is data which should be subjected to distributed processing is determined. The standard of this determination is arbitrary, but at the step S303, for example, whether the number of sheets to be printed is great (e.g. several hundreds of pages or more), whether for a mixture of color pages and monochromatic pages or the like, printing is impossible by a single printer, or whether processing which can be executed only by a particular printer, for example, aftertreatment such as binding, is designated, or the like can be determined.

At a step S304, job dividing conditions for executing distributed processing are read. To divide a job into a plurality, the result of division becomes different in accordance with a factor to give priority to, such as running cost priority, image quality priority or output speed priority, but here, the job dividing conditions are the designated data of these priority conditions preset by the user or the like.

At a step S305, the profile of each printer is read. This profile is what describes the capability of the printers on the network (which corresponds to the above-mentioned resource information), and it is to be understood that the profile is obtained from each printer at real time by the use of a suitable network print protocol, or is prepared in advance as part of system information in OS.

Here, the printer profile read from each printer includes color/black-and-white processing ability, a recording speed, accounting conditions (running cost: ¥20 per A4 single side, etc.), the presence or absence of an aftertreatment apparatus (such as a sorter or a stapler), the rate of jam, the rate of operation, etc. Among these, the accounting condition is determined by how much a counter in the printer is counted up, and each printer peculiarly has the count-up amount.

In the example of the profile shown in FIG. 3, the printer A is a color printer, is such that the printing speed thereof is 20 cpm, and the unit cost per A4 size sheet is ¥20. In FIG. 3, only the profile of the printer A is shown, but of course, about the other printers, similar profiles are read.

At a step S306, an optimum printer which can distribute and process a job by the use of such conditions as the current state, reliability, performance and unit cost of each of the above described printers is selected, and at a step S307, a suitable dialog is displayed on the display of the terminal 10 to thereby offer the user a printer which can be used for distributed processing. If at this time, there are plural sets of available printers, all of them may be displayed.

When at a step S308, the user selects a combination of particular printers (or a single printer in a case where distributed processing is not executed) from offered choices, at a step S309, the job is divided by the use of the aforementioned dividing condition and is transmitted to the selected printer or printers on the basis of a predetermined network print protocol. Thereafter, at a step S310, the actual printing process is carried out in each printer.

As described above, under the environment in which the printers are network-connected, it is often the case that use is made of a network print protocol which does not depend on a particular manufacturer's specification, and in that case, the exchanges of data are effected between image forming apparatuses produced by different makers. Thereby the range of the user's selection of actually used image forming apparatuses is widened, and the user can select an image processing apparatus connected to LAN from various conditions.

That is, in the system wherein the printers are network-connected as described above, the user can select a desired printer and accordingly, under the user's LAN environment, it shows a situation in which the printer is selected. That is, heretofore, each maker, if he has only provided the user with a better system with only his image processing apparatus as a target, has been able to maintain his predominance in the user even if a plurality of manufacturers are mixedly present in the user's LAN environment. In the future, however, unless any maker can provide information/environment/apparatus more attractable to the user, there comes out the possibility that even if the manufacturer supplies them, they will not be utilized.

On the other hand, when viewed from the technical side of the image forming apparatuses, the situation is such that an extreme discrimination in quality among the apparatuses cannot be made, and a distinction in the above-mentioned "reliability" and "performance" has become difficult to make. Regarding the "unit cost" as the remaining distinction item, as shown in FIG. 1, the price is determined by the cost when the apparatus is used as a single unit, and again in this item, the situation is such that a distinction is difficult to make. It is disadvantageous to makers that the distinction is difficult to make as described above. Accordingly, if under the network environment as noted above, there is a setup for appealing the predominance of one's own image forming apparatus by some technique, and making the user select one's own image forming apparatus, chances for one's own image forming apparatus to be used will increase.

Under the network environment as noted above, it is preferable to have only one's own image forming apparatus singly used, but it will be preferable if even in the case of the distributed recording process, there is such a setup that chances for one's own image forming apparatus to be used as one of a plurality of image forming apparatuses increases any more.

SUMMARY OF THE INVENTION

It is an object of the present invention to provide an image processing system for enabling an image forming apparatus produced by a manufacturer to be used as far as possible by a user.

In order to achieve the above object, according to a first aspect of the present invention, there is provided an image processing system for record-processing recording data by the use of at least two of a plurality of image forming apparatuses, the image processing system having a plurality of network-connected image forming apparatuses, a user interface portion for effecting recording control, and a presenting portion for offering to a user by the use of the user interface portion that the accounting condition of the image forming apparatus used for the recording process can be changed in accordance with a particular condition.

In order to achieve the above object, according to a second aspect of the present invention, there is provided the above-described image processing system wherein the above-mentioned recording process is a distributed recording process in which the recording data is outputted by the use of at least two of the plurality of image forming apparatuses, and the particular condition is to select a particular image forming apparatus of the plurality of image forming apparatuses as an output apparatus for the distributed recording process, and in a case where the image processing system, in the above-mentioned distributed recording process, further gives an output result outputted by a first image forming apparatus of the plurality of image forming apparatus to a second image forming apparatus of the plurality of image forming apparatuses to thereby effect predetermined output processing in the second image forming apparatus, the second image forming apparatus has a detecting portion for detecting that the given output result is one processed by the first image forming apparatus, and when it is detected through the detecting portion that a combination of the first image forming apparatus and the second image forming apparatus has been selected in the distributed recording process, the aforementioned accounting condition is changed.

According to the present invention, design is made such that by the utilization of a user interface for controlling a recording process, a manufacturer or a vendor can appeal the predominance, particularly economy of their image forming apparatuses and therefore, they can have their image forming apparatuses used as far as possible by the user.

The above and other objects, features and advantages of the invention will become more apparent from the following detailed description taken in conjunction with the accompanying drawings.

BRIEF DESCRIPTION OF THE DRAWINGS

FIG. 8 is an illustration showing an example of an accounting condition change according to the second embodiment.

FIG. 12 is an illustration showing an example of an accounting condition change according to the third embodiment.

DESCRIPTION OF THE PREFERRED EMBODIMENTS

Figures 1, 2:
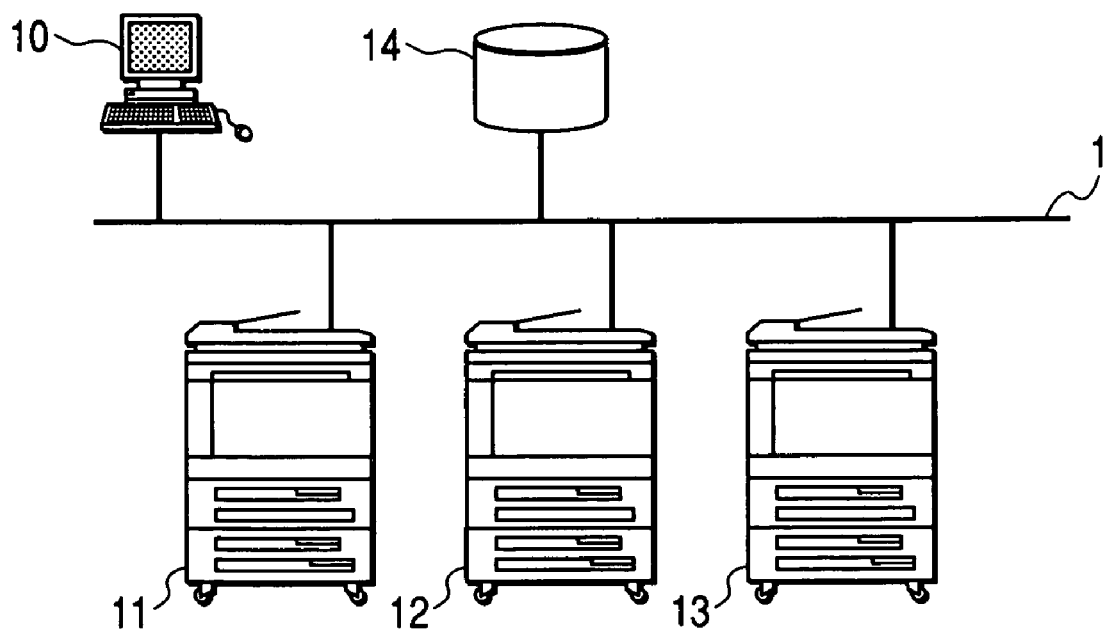
FIG. 1 is an illustration showing an example of conventional accounting.
FIG. 2 is a conceptual view showing a system construction in the conventional art or a first embodiment.

The present invention will now be described in detail with reference to the accompanying drawings showing some preferred embodiments thereof. In the drawings, elements and parts which are identical throughout the drawings are designated by identical reference characters and duplicate description thereof is omitted.

Figure 4:
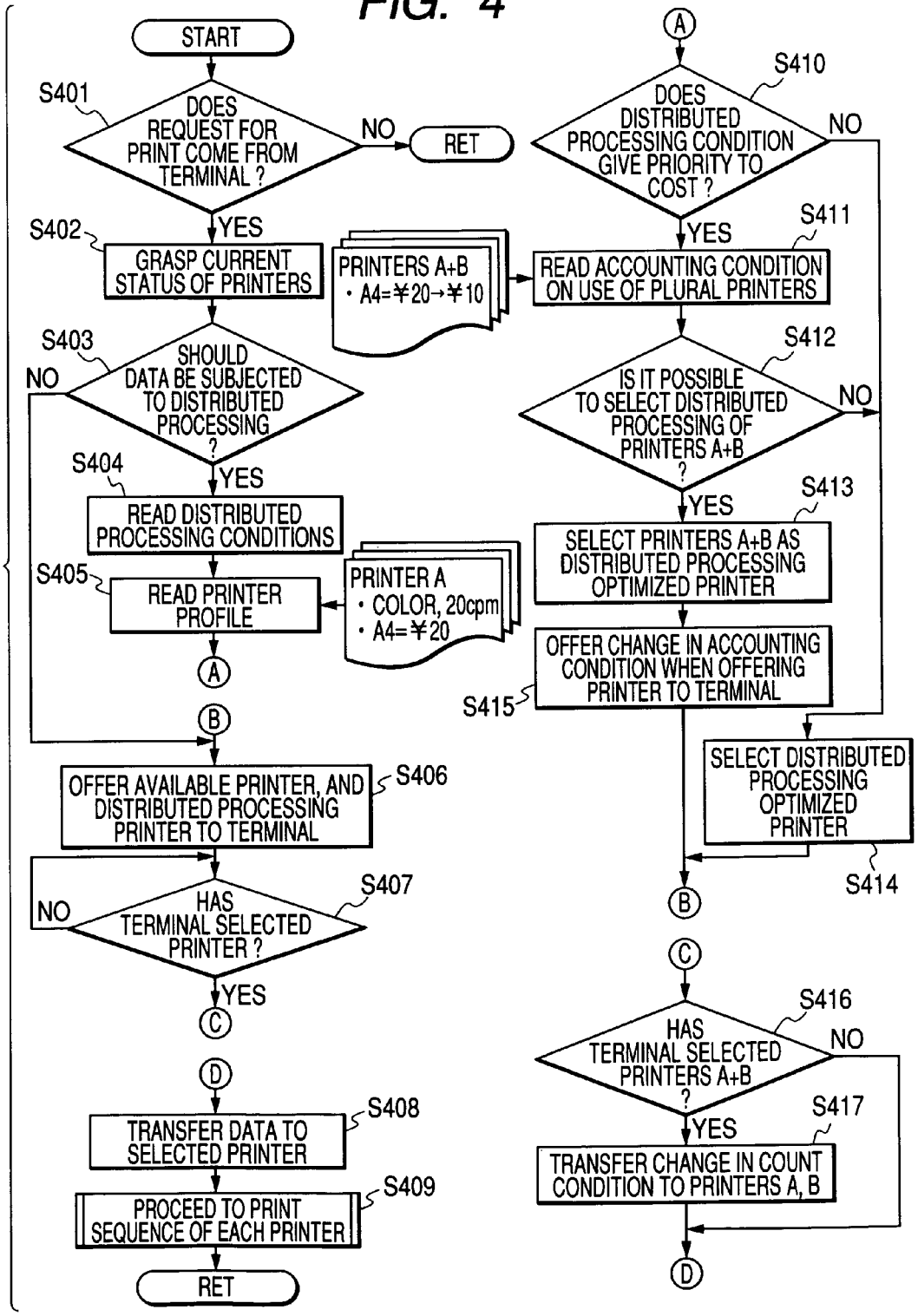
FIG. 4 is a flow chart showing a distributed recording process according to the first embodiment.

It is understood that a network environment according to a first embodiment is the same as that shown in FIG. 2, but in the present embodiment, at least printers (A and B) 11 and 12 are products by a manufacturer, and the control of FIG. 4 is effected by a printer server 14 to thereby enable the predominance, particularly economy, of the manufacturer's own image forming apparatuses to be appealed. Branch-off points given identical alphabetical letters in FIG. 4 shown that processing is continuous at those positions (this also holds true in the following drawings). The processing of FIG. 4 can also be executed by a terminal 10 and the printer server 14, but in the following description, it is to be understood that it is executed by the printer server 14.

Figure 3:
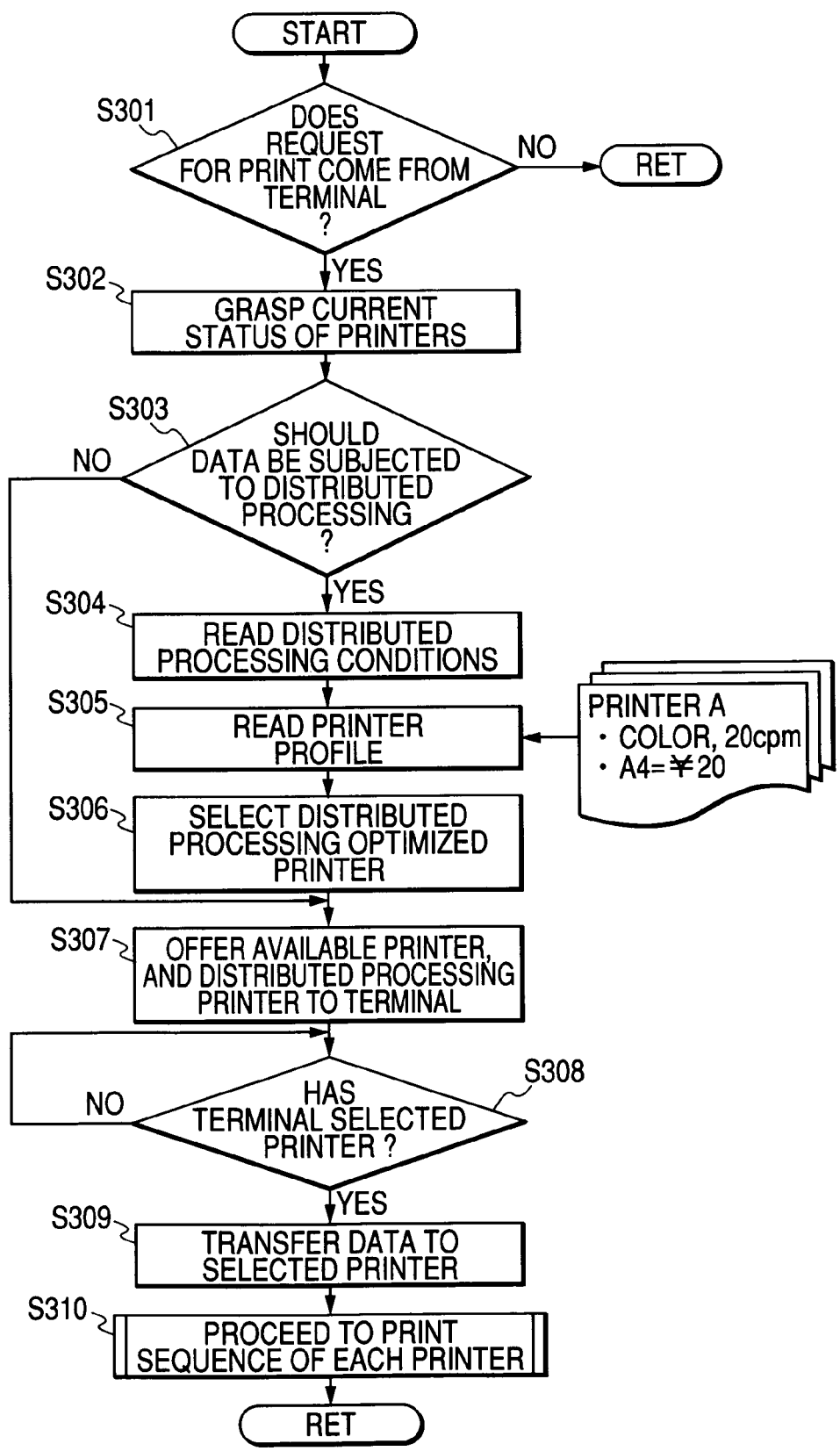
FIG. 3 is a flow chart showing a conventional distributed recording process.

The steps S401 to S405 of FIG. 4 are processes corresponding to the steps S301 to S305 of FIG. 3, and when as shown, distributed processing is selected, the processing until a printer profile is read is similar to that shown in FIG. 3.

In FIG. 4, after the reading of the profile (step S405), at a step S410, whether the distributed processing condition read at the step S404 gives priority to a running cost is judged.

If at the step S410, the distributed processing condition does not give priority to the running cost, an optimum printer for distributed processing is selected in accordance with the distributed processing condition as before (step S414), and the selected printer is offered to a user (step S406).

On the other hand, if at the step S410, the distributed processing condition gives priority to the running cost, at a step S411, an accounting condition during the use of a plurality of printers is read. This accounting condition is a predetermined one, and whether the accounting condition is changed by a combination of printers is described therein.

Heretofore, the accounting condition has been fixed, and whether distributed processing or single processing, it has not been changed, but yet in the present embodiment, a change of the accounting condition is effected so that the manufacturer can offer an inexpensive accounting condition when they offer a printer for distributed processing which will be described later, so as to be able to have the manufacture's own image forming apparatuses used as far as possible by the user in the case of distributed processing.

For example, in the case of the present embodiment, the printer A+the printer B are the maker's own image forming apparatuses, and such accounting conditions as (a) the printer A+the printer B: the accounting of the printer A×0.5, the accounting of the printer B×0.5, or (b) the printer A+a printer C: the accounting of the printer A×1, the accounting of the printer C×1 are predetermined ("the accounting of the printer X is a charge in case of ordinary single printer print or an ordinary charge determined in some form).

In the example of the above accounting conditions (a) and (b), it is shown that when a combination of the printer A and the printer B (which are the manufacturer's own products) is selected, the accounting is a half of the ordinary charge, but when a combination of the printer A and (for example) other manufacturer's own printer C is selected, the accounting condition (particularly the printer A) does not change.

By offering the accounting conditions as noted above, in distributed processing the possibility of having the combination of the printer A and the printer B (which are the manufacturer's own products) selected by the user becomes high.

At a step S412, if under the accounting condition of a plurality of printers, the accounting condition can proceed to a more inexpensive one by the combination of the printer A and the printer B, whether the printer A and the printer B can be selected as the distributed processing of the print job at this time is judged. When a dividing condition required of the print job and the combination of the printer A+the printer B coincide with each other, at a step S413, the combination of the printer A+the printer B is selected as the candidate of distributed processing, and at a step S415, the combination of the printer A and the printer B is offered to the terminal 10 as a combination of optimum printers and at the same time, the set-up of a flag or the like is effected so as to be able to also offer that the accounting condition can be changed at that time, and at a step S406, the offer of the actual combination of the printer A and the printer B and the offer of the changeability of the accounting condition are effected.

In the offer at the terminal 10 showing that the accounting condition is changeable, the above-noted accounting conditions (a) and (b) (or the display of the same purport as these) may be displayed, and further, the display of a row of characters (catchphrase) like "The accounting will be advantageous as noted above if you select distributed processing by our printers A+B." may be effected.

When at a step S407, the user has decided, from the offered combination of the printers, to effect printing by the combination of the printer A and the printer B, a predetermined command is transmitted to the printer A and the printer B via LAN 1 to thereby effect a change of the accounting conditions of these printers, i.e., a change of the count-up condition of an internal counter (steps S416 and S 417).

Figures 5, 6:
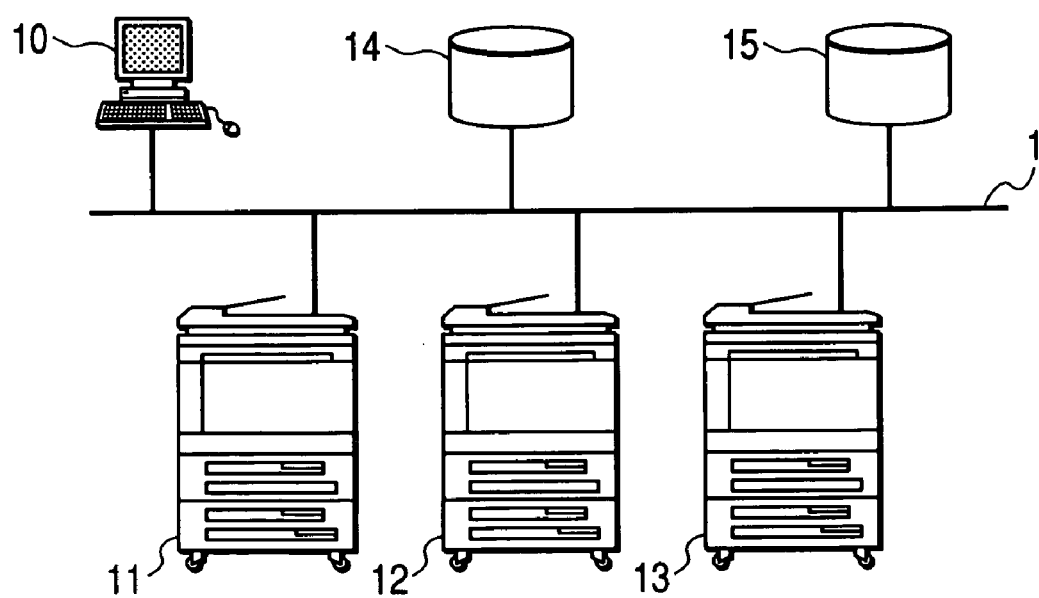
FIG. 5 is an illustration showing an example of an accounting condition change according to the first embodiment.
FIG. 6 is a conceptual view showing a system construction according to a second embodiment.

FIG. 5 shows an example of the change of the count-up conditions of the printer A and the printer B. In the example shown in FIG. 5, during A4 single side print, the printers A to C usually count up by two counts each. In contrast, when the combination of the printer A and the printer B is selected, the printer A changes to one count-up during each A4 single side print, and the printer B changes to one to two counts-up. The condition of FIG. 5 more or less differs from the above-mentioned accounting conditions (a) and (b), but when the accounting of the printer B cannot be discounted very much, it is also conceivable for the printer B to be thus kept in two counts-up. Whether the printer B should be kept in one count-up or two counts-up can be arbitrarily set by the vendor.

In the manner described above, at an opportunity for carrying out the distributed recording process, a proposition to change (discount) the accounting condition of the image forming apparatus can be made by the utilization of the user interface so as to enable the manufacturer or the vendor to appeal the predominance, particularly economy, of their own image forming apparatuses, and to induce the user to use their own image forming apparatuses as far as possible.

In a second embodiment, there is shown an embodiment in an environment when as shown in FIG. 6, on the LAN 1, there exists an accounting server 15 for totalizing the printing situations of the respective printers through a status. In the other points, the construction of FIG. 6 is similar to that of FIG. 2.

Figure 7:
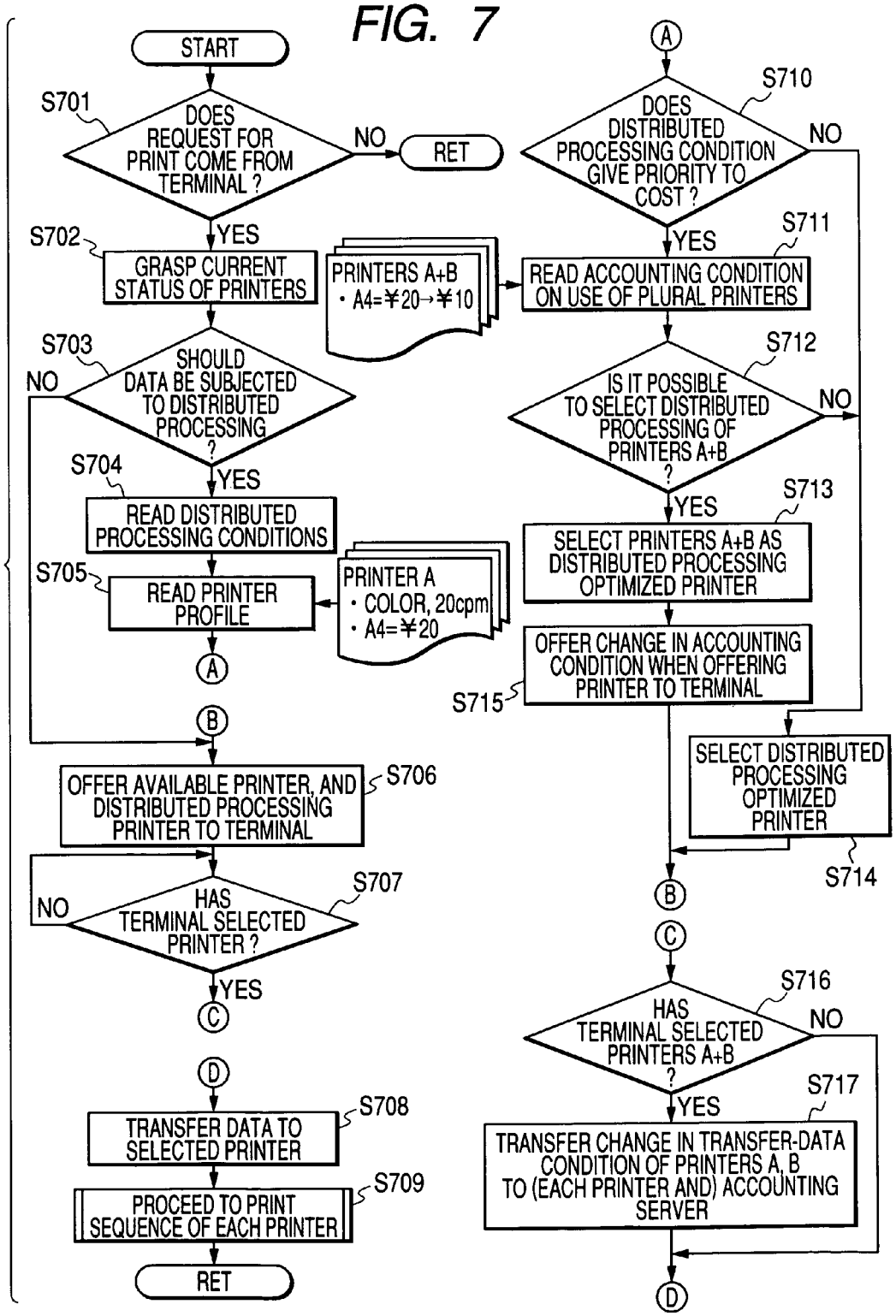
FIG. 7 is a flow chart showing a distributed recording process according to the second embodiment.

FIG. 7 shows the control of the present embodiment. FIG. 7 is a flow chart of a form equal to that of FIG. 4, and use is made of step numbers of the order of 700, and the places 1 and 10 in the step numbers of the respective steps are made coincident with those of the corresponding steps of FIG. 4.

As shown, the entire processing of FIG. 7 is similar to that of FIG. 4, but at least the change data of the accounting condition at a step S717 is transmitted to the accounting server 15. Also, a printer profile read at step S705 and an accounting condition read at a step S717 may be individually obtained from each printer by the terminal 10 as in the first embodiment, but there may be adopted such a construction that such information is collectively managed by the accounting server 15, and is obtained from the accounting server 15 by the terminal 10.

Again in FIG. 7, when the distributed recording process can be utilized and the setting of cost priority is done, a proposition to change (discount) the accounting condition of the image forming apparatus regarding (the maker's own) printers A+B can be made (step S715), but when thereby, the user selects the distributed recording by the combination of the printer A and the printer B which is a change of the accounting condition, at a step S717, data to be transferred to the accounting server 15 is changed to thereby effect a change of the accounting condition.

FIG. 8 shows an example of the data transferred to the accounting server 15 at the step S717. Each column of FIG. 8 corresponds to the contents of a different recording process, and shows the content of control data transmitted to the accounting server 15.

In the example shown in FIG. 8, in the case of the printing of a single side of A4, usually the total number of printed sheets and the number of printed sheets for the single side of A4 are transferred. Then, the accounting sum is converted at a predetermined accounting percentage by the accounting server 15 and is determined. In the example shown in FIG. 8, the count number of the single side of A4 multiplied by 20 is accumulated as accounting information (at yen unit) in the accounting server 15.

Also, during the printing of a single side of A4 when the printer is used in operative association with the printer A+the printer B, data is transferred with the single side when interlocking the printers of a category differing from the foregoing. On this single side of A4 when interlocking the printers, the accounting percentage is also set, and in the example shown in FIG. 8, 10 times (at yen unit) is set, and the accounting is set so as to be lower even for the same number of printed sheets than in ordinary printing.

If the accounting server 15 is of a construction in which it collectively manages all the accounting information, at the step S717 of FIG. 7, such accounting information as shown in FIG. 8 can be transmitted to the accounting server 15 in accordance with the content of the recording process, but when the accounting information is (also) managed in each printer, a change of the accounting information is also indicated to each printer used for recording, as in the case of FIG. 4.

Again in the construction using the accounting server 15 for managing the accounting information as described above, the proposition to change (discount) the accounting condition of the image forming apparatus can be made by the utilization of the user interface at an opportunity for carrying out the distributed recording process, to thereby enable the manufacturer or the vendor to appeal the predominance, particularly economy, of their own image forming apparatuses, and enable the user to be induced to use their own image forming apparatus as far as possible.

In a third embodiment, there is shown an embodiment in a case where in the LAN environment, there exists a printer having connected thereto an aftertreatment apparatus for effecting particular aftertreatment such as binding or sorting on printed sheets.

Figure 9:
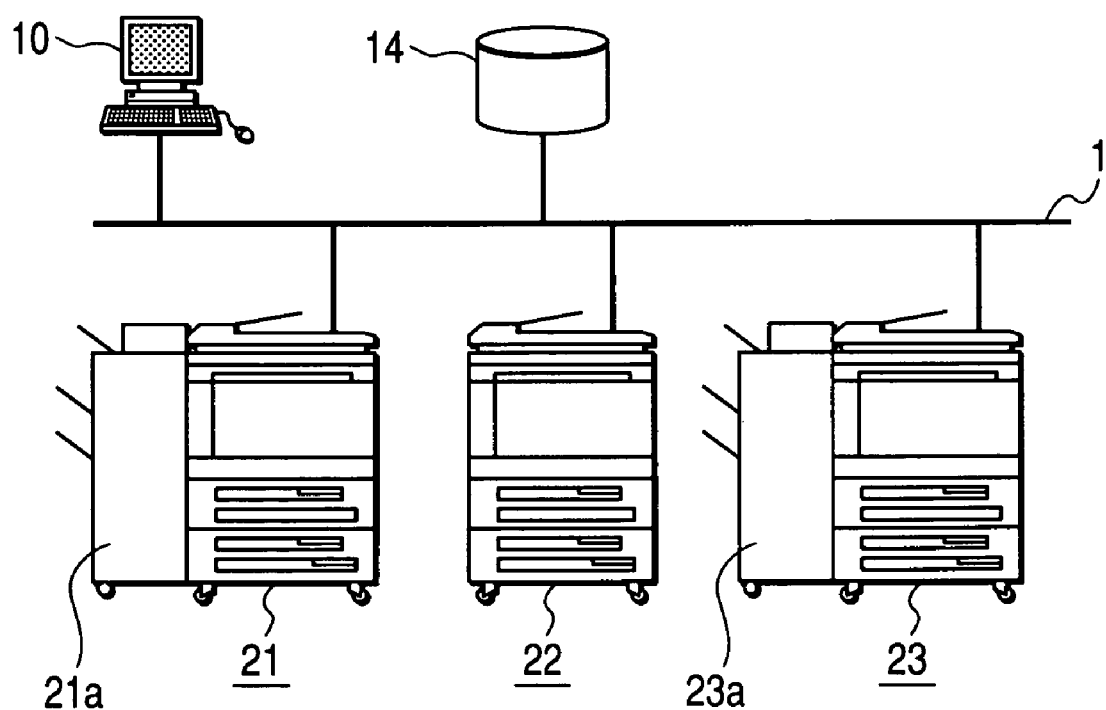
FIG. 9 is a conceptual view showing a system construction according to a third embodiment.

In FIG. 9, three printers (A to C) 21 to 23 are connected together on the LAN 1. The printers (A to C) 21 to 23 are equal to the printers (A to C) 11 to 13 of FIG. 2 or FIG. 6, but on the printer (A) 21 and the printer (C) 23, there are installed aftertreatment apparatuses 21a and 23a for effecting particular aftertreatment such as binding or sorting on printed sheets, and the particular aftertreatment is possible in synchronism with the outputting of these printers. Also, it is to be understood that (at least) the printer (A) 21 and the printer (C) 23 are provided with an inserter (or an onto sheet feeder or the like), and the particular aftertreatment (such as, for example, binding) can be effected on both of sheets newly printed by the printer and inserted sheets.

When the user desires to carry out distributed processing and aftertreatment at a time, the user carries out the processing, for example, in the following procedure. Here, an output printed by a printer (B) 22 is applied to the inserter, for example, of a printer (A) 21 having an aftertreatment apparatus, to thereby carry out the aftertreatment with the output of the printer (A) 21. That is, (1) Distributed processing is selected by the user interface of the terminal 10.

(2) The printer B which does not carry out aftertreatment is designated.

(3) The output of the printer B is set at the inserter of the printer A (or C) having the aftertreatment apparatus.

(4) Unoutputted data is transferred to the printer A (or C).

(5) The inserted output of the printer B is also aftertreated simultaneously with the output in the printer A (or C).

In items (1) to (5) above, the user can arbitrarily select any of the printers on the LAN which have the aftertreatment apparatuses. The identification of the printer and the transfer of data can be automatically effected.

In such a construction, to offer a change of accounting, and actually effect the change of accounting when distributed processing is carried out as shown in the above-described embodiment, it is necessary to identify by which printer the output sheet of a printer, particularly a printer which has an inserter and can receive the output sheets of other printer, has been processed.

Figure 10:
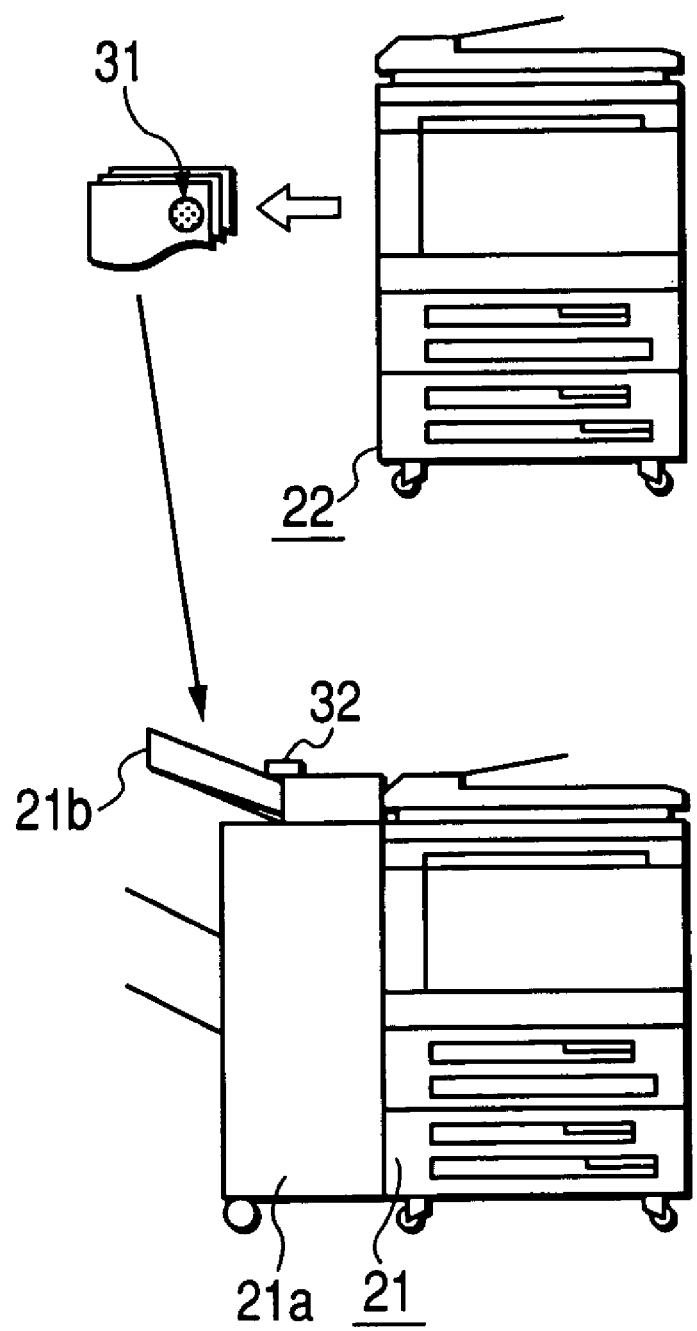
FIG. 10 is a conceptual view showing a construction for printer identification according to the third embodiment.

The construction of printer identifying means for this is shown in FIG. 10. The example shown in FIG. 10 is a construction when as in the examples (1) to (5) shown above, outputs including the output of the printer (B) 22 are aftertreated by the printer (A) 21, and the printer (B) 22 which effects printing at first adds identifying information 31 to output sheets (including plastic sheets such as OCR sheets, etc.).

This identifying information 31 can be constituted by a marker, a bar code, a particular pattern or any memory device by a particular memory method which can cause the information to adhere to a sheet by a method such as embedding, and may be any information which can identify that outputting has been done by the printer B.

Also, as the output form of the identifying information 31, there is conceivable, besides such an output form that the printer (B) 22 attaches identifying information to the first page (only) of a printout, an output form such as outputting an output sheet for identification at an output position such as the first page discretely from a printout. Also, the identifying information 31 may be printed with visible ink, or may be printed in an invisible form so as not to be a hindrance to original output information.

On the other hand, a sensor 32 capable of reading the identifying information 31 is provided on the printer (A) 21 for receiving the output of the printer (B) 22 by an inserter 21b. Of course, the detecting method of the sensor 32 is a method which can read the identifying information 31 outputted in each of the above-mentioned forms.

The output sheet of the printer B to which the identifying information 31 is added is set on the inserter 21b of the printer (A) 21 which has the sensor 32. By using information from this sensor 32, a server 14 (or the server 14 and terminal 10 which effect print control) can identify the following information regarding the output sheet set on the inserter 21b.

The output of which print job is it?

From which printer has it been outputted?

On which inserter has it been placed?

By using the identifying information 31 in this manner, it is possible to identify at a stage for starting aftertreatment that distributed processing by a plurality of printers is carried out, whereby the offer of a change of accounting and a change of accounting information can be effected.

Figure 11:
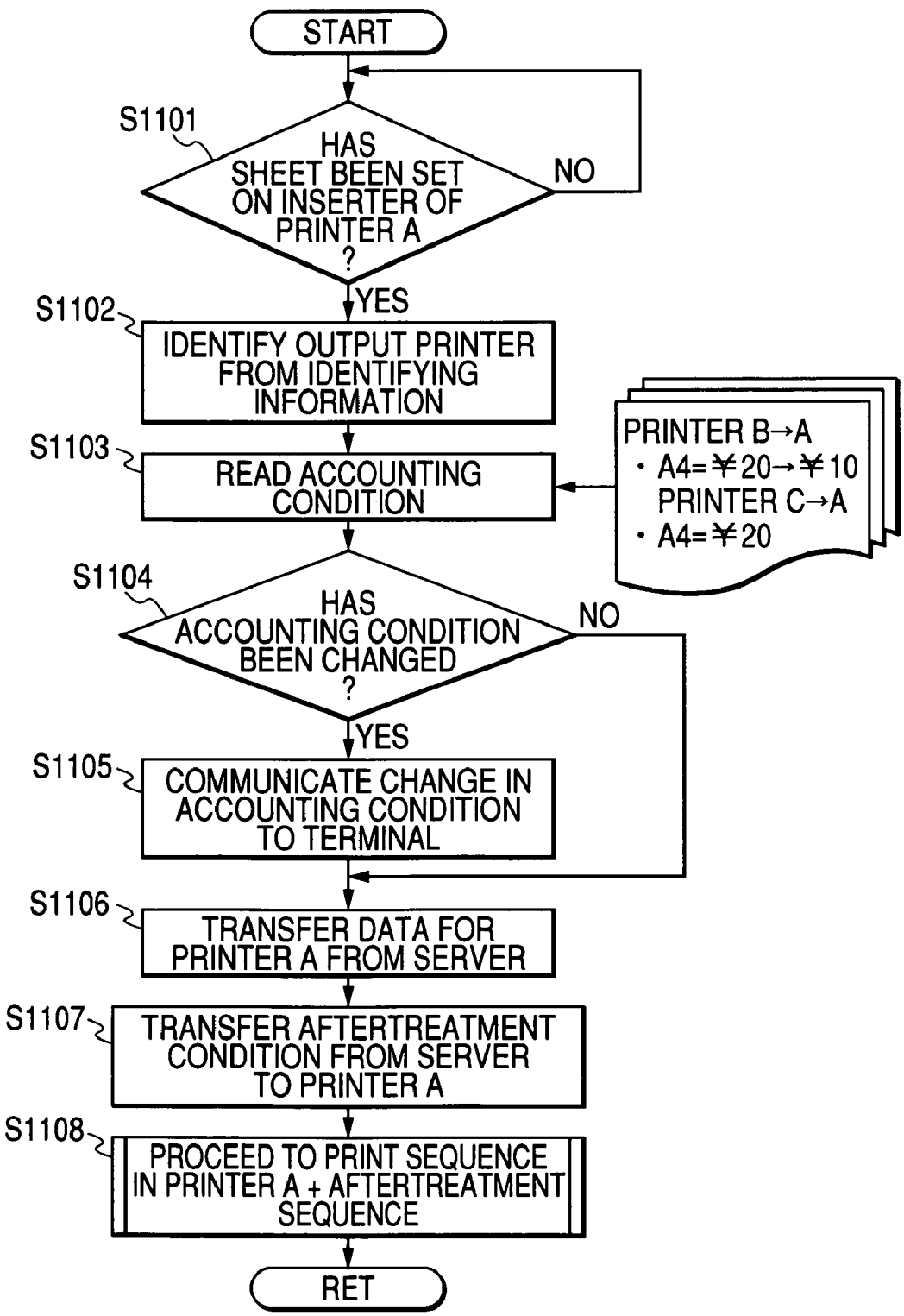
FIG. 11 is a flow chart showing a distributed recording process according to the third embodiment.

The print control in the present embodiment is shown in FIG. 11. FIG. 11 shows, in the print control when as in the examples shown in items (1) to (5) above, outputs including the output of the printer (B) 22 are aftertreated by the printer (A) 21 having the aftertreatment apparatus, the processing after the output of the printer (B) 22 has been set on the inserter 21b of the printer (A) 21. The shown processing can be executed, for example, in the printer server 14.

When at a step S1101, the output of the printer (B) 22 is set on the inserter 21b of the printer (A) 21, it is identified from the above-described identifying information 31 that the printer from which the outputting of the said output sheet has been effected is the printer B (step S1102).

Subsequently, an accounting condition file prepared in advance is read (step S1103). It is to be understood that the contents described in this accounting condition file are the changes of the accounting condition by the combination of printers as follows, if for example, at least the printer A and the printer B are apparatuses produced by the manufacturer concerned.

The output of the printer B is set on the printer A⇒the accounting of the printer A×0.5

The output of the printer C is set on the printer A⇒the accounting of the printer A×1

As described above, in a combination of particular printers, the accounting condition is changed. The change of the accounting can be determined by the count-up amount as in the first embodiment. As is apparent in the example of the change of the accounting shown above, on the LAN, there exists the (other manufacturer's) printer (C) 23 having an inserter and an aftertreatment apparatus, besides the printer A, but when the output of the printer B has been set on the printer C, a change of the accounting condition is not effected, on the basis of the above-described condition file.

When as described above, the output of the printer (B) 22 has been set on the inserter 21b of the printer (A) 21, a change of the accounting condition is effected on the basis of the above-described accounting condition file, and the accounting becomes a half sum.

When the change of the accounting condition has been effected (step S1104), it is communicated to the user through the terminal 10 that the accounting condition is changed. In this case, for example, an actually applied accounting sum (or a count value) is displayed and also, the display of a row of characters (catchphrase) such as "You have selected distributed processing by our printers B+A and therefore, advantageous accounting is applied to you as noted above." can be effected.

Thereafter, unoutputted data and an aftertreatment condition are transferred from the server 14 (or the terminal 10) to the printer (A) 21 (steps S1106 and S1107) because it is detected by the identifying information 31 that the output of the printer B is placed on the inserter of the printer A. After the printer A has received these data, the printer A carries out aftertreatment of a printout and the output of the printer B put together (step S1108).

In the manner described above, again in the distributed processing carried out with the output sheet moved from a printer to another printer, use is made of the identifying information 31 and the sensor 32 therefor, whereby the distributed processing by a combination of particular printers can be identified, and a change of the accounting condition and the offer thereof to the user can be effected, and even if a printer with an aftertreatment apparatus is selected (a sheet is set), the change of the accounting condition can be effected appropriately. That is, at an opportunity for carrying out the distributed recording process, a proposition to change (discount) the accounting condition of the image forming apparatus can be made by the utilization of the user interface therefor to thereby enable the manufacturer or the vendor to appeal the predominance, particularly economy, of their own image forming apparatuses, and to induce the user to use their own image forming apparatuses as far as possible.

FIG. 12 shows an example of the count-up amount in a third embodiment. When the output of the printer B is set on the printer A, the count-up amount of the printer A is changed to/to thereby effect a change of the accounting condition.

However, unlike the first embodiment, during the first printer outputting, which printer will be selected thereafter is not known and therefore, it is a matter of course that the change of the accounting condition is not effected, and during the first outputting by the printer B in the above-described distributed processing, the same count-up amount of 2 as that during the ordinary time shown at the middle stage in FIG. 12 is applied.

The present invention can be carried out in an image processing system constructed on a network by the use of an image forming apparatuses of any recording type. Also, in the above-described embodiments, the recording control of the present invention has been described as being effected by the terminal or the printer/the accounting server; but for example, in a case where the image forming apparatus itself has the function of the terminal or the server, the recording control of the present invention can be mounted on the image forming apparatus. That is, the method and program of the present invention can be executed in any apparatuses on an image processing system, and the method and program of the present invention can be introduced into these subject apparatuses via a suitable storage medium or via the network.

This application claims priority from Japanese Patent Application No. 2004-077380 filed Mar. 18, 2004, which is hereby incorporated by reference herein.

What is claimed is:

1. An image processing system, comprising:
   a plurality of network-connected image forming apparatuses;
   an information processing device, which performs a distributed printing process to distribute recording-data to at least two or more image forming apparatuses of said plurality of image forming apparatuses, wherein the distributed printing process includes cost as a processing condition;

a selecting device for a user to select a combination of said at least two or more image forming apparatuses to be used in the distributed printing process;

a reading device configured to read a predetermined accounting value for each of the at least two or more image forming apparatuses selected by the selecting device;

a calculating device configured to calculate, based on accounting values read by the reading device, a printing fee to be charged to the user for the distributed printing process for the combination selected by the user using the selecting device;

a determination device which determines at least one combination of the at least two image forming apparatuses selected by the user using the selecting device which can perform the distributed printing process for a less expensive fee than said printing fee calculated by the calculating device, wherein at least one combination determined by the determination device comprises two or more image forming apparatuses of a same manufacturer;

a terminal, which offers the user the at least one different combination of the at least two image forming apparatuses for the distributed printing process determined by the determination device, and which offers the user to change to one of the less expensive combinations;

an accounting value change device which, if the user changes the combination of said at least two or more image forming apparatuses to be used in the distributed printing process to a combination offered by the terminal, transmits accounting condition change data to each of the image forming apparatuses constituting the changed combination, wherein each of the image forming apparatuses of the changed combination receive their respective accounting condition change data and change their accounting value accordingly, wherein, the distributed printing process is performed by the image forming apparatuses constituting the changed combination and the user is charged the less expensive printing fee for the distributed printing process based on the changed accounting values, and wherein the system further comprises:

an identifying information adding device configured to add identifying information including information representing which image forming apparatus outputs a sheet, on the sheet output from the image forming apparatus; and a sensor provided in each of the image forming apparatuses to read the identifying information added on the sheet by the identifying information adding device, wherein the accounting value change device changes the accounting value on the basis of the identifying information read by the sensor.

* * * * *